United States Patent [19]

Nojiri et al.

[11] 4,096,992

[45] Jun. 27, 1978

[54] SYSTEM FOR RECOGNIZING BAR CODE INFORMATION

[75] Inventors: Tadao Nojiri, Kariya; Akio Sugiura, Nagoya, both of Japan

[73] Assignee: Nippondenso Co., Ltd., Kariya, Japan

[21] Appl. No.: 823,737

[22] Filed: Aug. 11, 1977

[30] Foreign Application Priority Data

Sep. 6, 1976 Japan .......................... 51-106535

[51] Int. Cl.² .................. G06K 7/14; G06K 9/13; G06K 7/10
[52] U.S. Cl. .................. 235/462; 340/146.3 AG
[58] Field of Search ............... 235/61.11 E, 61.12 N, 235/61.7 B; 250/568, 569; 340/149 A, 151, 152, 146.6AG; 328/151; 35/48 B

[56] References Cited

U.S. PATENT DOCUMENTS

| | | | |
|---|---|---|---|
| 3,599,151 | 8/1971 | Harr | 340/146.3 AG |
| 3,628,031 | 12/1971 | Azure | 250/569 |
| 3,849,632 | 5/1973 | Eckert | 235/61.11 E |
| 3,909,594 | 12/1973 | Allais | 235/61.11 E |
| 3,927,303 | 2/1973 | Wefers | 235/61.11 E |

*Primary Examiner*—Robert M. Kilgore
*Attorney, Agent, or Firm*—Cushman, Darby & Cushman

[57] ABSTRACT

A bar code having a plurality of parallel bars recorded in either narrow width or wide width is scanned by a plurality of light responsive elements which are driven one by one by a clock pulse of a fixed frequency. The intermittent output image signal of the elements is converted into a continuous signal by sample-and holding the peak level of the image signal at the same frequency as that of the clock pulse. The continuous signal is then compared with a reference value to be converted into a rectangular signal which has time intervals proportional to respective bar widths. For discriminating each bar width, each time interval of the rectangular signal is measured by counting a clock pulse of another fixed frequency and compared with another reference value. The frequency of the clock pulse for interval measuring purpose is determined to be higher than that of the clock pulse for scanning and sample-and-holding purposes.

4 Claims, 6 Drawing Figures

SYSTEM FOR RECOGNIZING BAR CODE INFORMATION

CROSS-REFERENCE TO A RELATED APPLICATION

The present invention is related to a U.S. patent application Ser. No. 668,036 entitled "METHOD AND APPARATUS TO READ IN BAR-CODED INFORMATION," filed on Mar. 18, 1976 in the name of Tadao Nojiri et al and assigned to the same assignee as the present invention

BACKGROUND OF THE INVENTION (1) Field of the Invention

The present invention relates to a system for recognizing bar code information in which a plurality of parallel bars recorded in different widths are electronically scanned to be converted into a rectangular signal having time intervals proportional to the bar widths and each time interval of the rectangular signal is measured to be compared with a reference value, and more particularly to the system in which signal converting and interval measuring operations are improved.

(2) Description of the Prior Art

Various systems for recognizing bar code information are known well. It must be stated herein as one of prior arts that the above-identified U.S. patent application Ser. No. 668,036 is pertinent to the present invention.

Disclosed in this prior application is that a plurality of bar symbols having different widths are recorded in parallel with each other to constitute a bar code, the bar code is scanned transversely to the longitudinal direction of the bar by a plurality of light responsive elements which are driven one by one by a clock pulse of a fixed frequency, the output signal of the light responsive elements is converted into a rectangular signal having the time intervals proportional to respective bar widths, and each time interval is discriminated as to whether it corresponds to the wide bar or the narrow bar. Sample-and-holding the signal level is accomplished by the clock pulse in the signal converting operation and measuring the time interval is accomplished by clock pulses prior to the discriminating operation. The frequencies of the clock pulses for code scanning purpose, sample-and-holding purpose and interval measuring purpose are determined to be equal to each other.

SUMMARY OF THE INVENTION

It is a primary object of this invention to improve the signal converting and interval measuring operations of the prior art system described hereinabove.

It is another object of this invention to smooth the output signal of sample-and-holding operation in the signal converting operation.

It is a further object of this invention to measure the time interval of rectangular signal by counting a clock pulse of a fixed frequency higher than that used in the code scanning and sample-and-holding operations.

DESCRIPTION OF THE PREFERRED EMBODIMENTS

Figure 1:
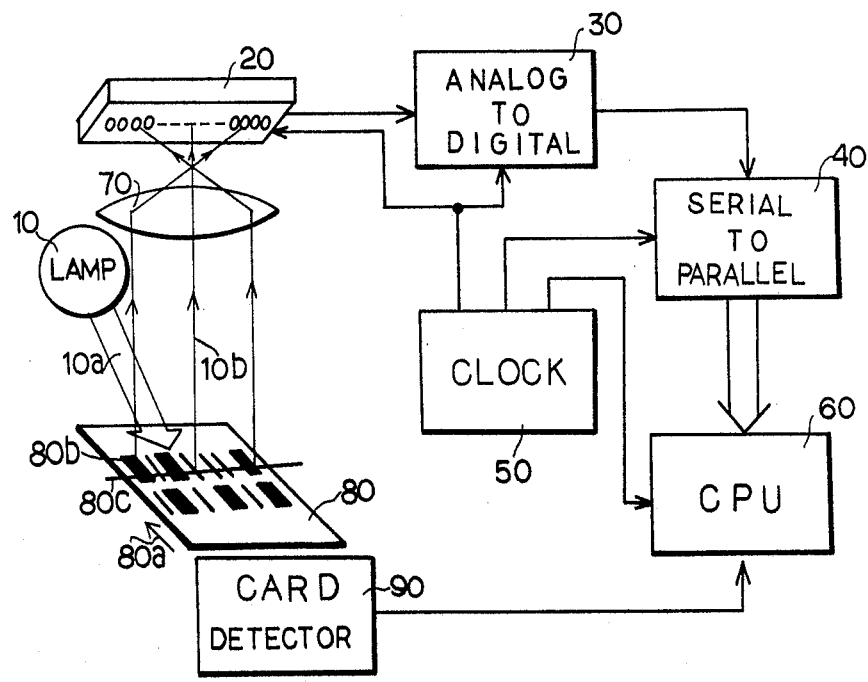
FIG. 1 is a schematic diagram illustrating a system according to the present invention.

Referring first to FIG. 1, a light source 10 such as a reflector lamp is employed to uniformly supply illumination light 10a over a card 80. An image sensor 20 having a plurality of photo diodes aligned on a straight scanning line receives the image to produce respective signals indicating the density of the reflected light 10b produced from the card 80. Each photo diode of the diode array is swept in sequence upon receipt of a clock pulse from a clock circuit 50 and generates an image signal, the signal level of which corresponds to the density of the reflected light 10b. A lens 70 is optically coupled with the image sensor 20 for light converging purpose. The image sensor 20 is connected to an analog-to-digital circuit 30 which converts a train of image signals into a train of rectangular signals. The A-D circuit 30 is connected to a serial-to-parallel circuit 40 which converts the serial rectangular signals into plural bits of digital signals. The S-P circuit 40 is connected to a central processing unit 60 such as a micro processor which recognizes scanned bar codes represented by the digital signals. The A-D circuit 30, the S-P circuit 40 and the CPU 60 are connected to receive respective clock pulses from the clock circuit 50 for controlling respective operations. The frequencies of clock pulses applied to the image sensor 20 and the A-D circuit 30 are equal to each other, whereas the frequency of the clock pulse applied to the S-P circuit 40 is twice as high as that applied to the A-D circuit 30. On a surface of the card 80 are printed numbers of bar codes. According to the present invention, printed bar codes are grouped into several columns which are parallel to each other. Each bar symbol 80b of the bar code is arranged to extend in parallel with a card transferring direction denoted by an arrow 80a. The card transferring direction is transverse to the scanning direction 80c of the image sensor 20. The card 80 may be transferred either manually or automatically. A light responsive card detector 90 is connected to the CPU 60 to apply the detection signal indicative of the presence of the card 80 transferred thereover.

Figure 2:
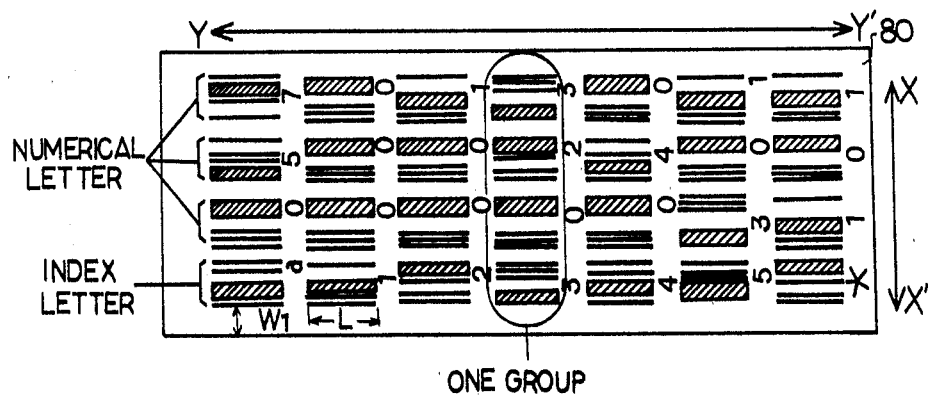
FIG. 2 is an enlarged top plan view of the card shown in FIG. 1.

Bar code information on the card 80 according to the present invention is shown in FIG. 2. Each bar symbol is recorded in either black or white and in either wide or narrow widths. Thus combined, four kinds of bar symbols have a unit length L. Each bar code (one letter or one digit) consists of two wide bar symbols and five narrow bar symbols determined by four black bar symbols and three white bar symbols therebetween. Thus one letter is derived from "2 OUT OF 7 combinations" in which two wide bar symbols, one in black and the other in white, among a total of seven bar symbols are used. Further, the bar widths N and W of the respective narrow and wide bar symbols are determined to satisfy the relationship $W = 2.5N$ therebetween. Thus, the total width 10N (5N+2W) is alloted for each bar code on the card 80, and the same width W as the wide bar symbol is alloted between adjacent bar codes. A group of bar codes are aligned in a column (X—X' direction) parallel to the scanning line of the image sensor 20 to constitute a 4-digit letter comprising an index letter and three numerical letters, thus occupying the group code width 50N. Each group of bar codes in each column is juxtaposed with its head and tail lining up in a direction (Y—Y' direction) which coincides with the card transferring direction 80a. And at the marginal portions, white spaces of the width $W_1$ are formed as record prohibition regions. The width $W_1$ is arranged to be wider than 6N. It must be noted that the specific index letters @ and * excluded from the above-described "2 OUT OF 7 combinations" are used respectively in the first and the last groups so that the encoded information of the card 80 may not be erroneously recognized when the card is transferred in the opposite direction. Thus, the bar code information having seven groups in rows includes letter information of 21 digits per card.

According to the system arrangement of FIG. 1 and the code arrangement of FIG. 2, plural times of code scanning is automatically attained for the same bar code during the movement of the card 80. Provided that the unit length of each bar is 10 mm, the moving speed of the card 80 is 200 mm/sec, the image sensor 20 is provided with 400 photo diodes, and the photo diodes are driven at a fixed frequency 200KH$_Z$, each bar code is scanned 25 times by the image sensor 20. When one half of a total of four hundred photo diodes are used in actual code scanning, the narrow bar and the wide bar are scanned by 4 photo diodes and 10 photo diodes, respectively.

Figure 3:
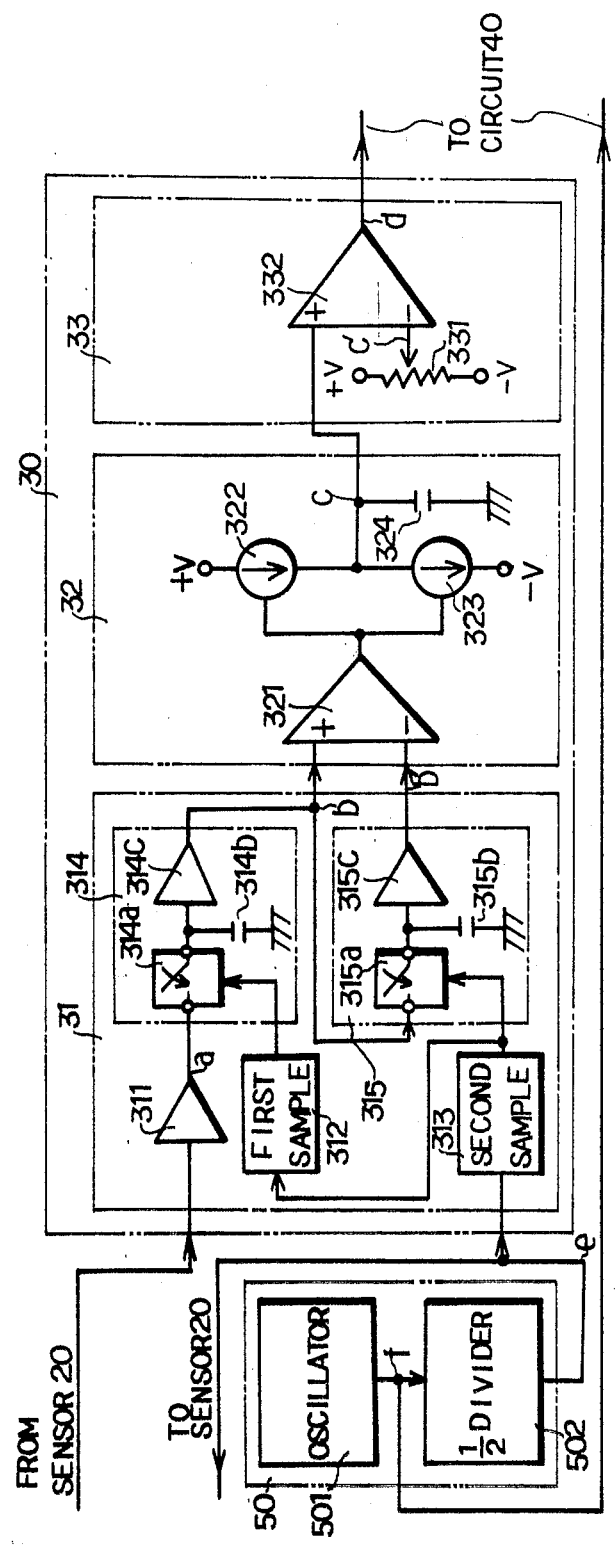
FIG. 3 is an electric wiring diagram illustrating partly the first embodiment of the system shown in FIG. 1.

Detail circuit constructions of the A-D circuit 30 and the clock circuit 50 according to the first embodiment are shown in FIG. 3, in which the A-D circuit 30 is illustrated to include a sample-and-hold circuit 31, a smooth circuit 32 and a comparison circuit 33, and in which the clock circuit 50 is illustrated to include an oscillator 501 and a frequency divider 502.

The sample-and-hold circuit 31 is constituted by an amplifier 311, a first sample pulse generator 312, a second sample pulse generator 313, a first sample holder 314 and a second sample holder 315. The first sample holder 314 is constituted by an analog switch 314a connected to be controlled by the first sample pulse generator 312, a capacitor 314b and a buffer gate 314c, whereas the second sample holder 315 is constituted by an analog switch 315a connected to be controlled by the second sample pulse generator 313, a capacitor 315b and a buffer gate 315c. The first and second sample pulse generators 312 and 313 are connected to receive the clock pulse which are produced from the frequency divider 502 of the clock circuit 50 and applied to the image sensor 20. The first and second sample pulses generated by the respective first and second sample pulse generators 312 and 313 are equal in frequency to each other and further equal to the clock pulse applied to the image sensor 20 in frequency. The first sample holder 314 is connected to receive the image signal produced from the image sensor 20, whereas the second sample holder 315 is connected to receive the output signal of the first sample holder 314. The smooth circuit 32 is constituted by a subtractor 321, a first current source 322, a second current source 323 and a capacitor 324. The subtractor 321 is connected to receive the output signals of the first and second sample holders 314 and 315 of the sample-and-hold circuit 31. The first current source 322 is connected to charge the capacitor 324 in response to the positive output signal of the subtractor 321, whereas the second current source 323 is connected to discharge the capacitor 324 in response to the negative output signal of the subtractor 321. The comparison circuit 33 is constituted by a variable resistor 331 for establishing a constant reference level and a comparator 332 for comparing the output level of the smooth circuit 32 with the constant reference level.

Figure 4:
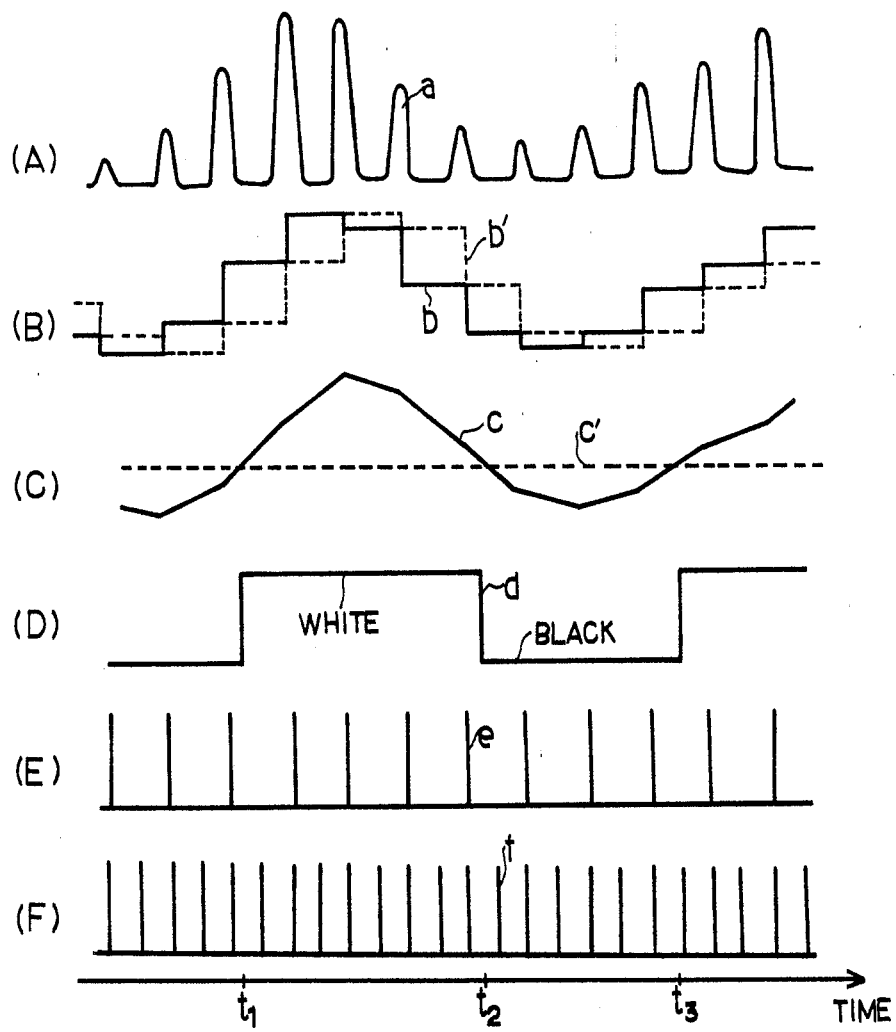
FIG. 4 is a time chart illustrating signal waveforms (A) to (F) useful for explaining the operation of the first embodiment shown in FIG. 3.

The operation of the first embodiment shown in FIG. 3 is described hereinunder with reference to the signal waveforms shown in FIG. 4.

As the photo diodes of the image sensor 20 are driven one by one by the clock pulse (e) produced by the clock circuit 50 and shown in (E) of FIG. 4, each photo diode produces the image signal having the signal level corresponding to the density of reflected light 10b. Since the light reflectivity of the black bar is lower than that of the white bar, the signal level of the image signal becomes high and low when the white bar and the black bar are scanned, respectively. The image signal produced serially from the image sensor 20 is applied to the sample-and-hold circuit 31 and amplified first by the amplifier 311. The image signal (a) once amplified is synchronized with the clock pulse (e) as shown in (A) of FIG. 4. The first sample pulse generator 312 generates the first sample pulse synchronized with the clock pulse (e) and closes the analog switch 314a. The image signal (a) is passed through the analog switch 314a to charge the capacitor 314b which holds the peak level of the image signal (a) during the opening of the switch 314a. The first sample-and-hold circuit 314, thus sample-and-holding the image signal (a), produces the output signal (b) which stepwisely changes as shown in (B) of FIG. 4. The second sample-and-hold circuit 315 sample-and-holds the output signal (b) in response to the second sample pulse generated by the second sample pulse generator 313 in the same manner as the first sample-and-hold circuit 314 and produces the output signal (b') as shown in (B) of FIG. 4. It must be understood herein that the changing amount of the output signal (b) is proportional to that of the image signal (a) and the output signal (b') is delayed by one cycle period of the clock pulse (e). The output signals (b) and (b') are both applied to the smooth circuit 32. When the output signal (b) exceeds the output signal (b'), the subtractor 321 produces the positive output signal which in turn causes the capacitor 324 to be charged by the first current source 322. When the output signal (b') exceeds the output signal (b), on the contrary, the subtractor 321 produces the negative output signal which causes the capacitor 324 to be discharged by the second current source 323. As a result, continuous analog signal (c) is produced across the capacitor 324 as shown in (C) of FIG. 4. It should be noted that the changing rate of the continuous signal (c) in each period of the clock pulse (e) is proportional to the difference between the output signals (b) and (b') and the intermittent image signal (a) is smoothed to the continuous signal (c). This continuous signal (c) is applied to the comparison circuit 33 and compared with the reference signal (c') by the comparator 332. The comparator 332 produces the rectangular signal (d) shown in (D) of FIG. 4. The rectangular signal (d) has high level and low level to represent the white bar and the black bar, while the continuous signal (c) is higher and lower than the reference signal (c'), respectively. It would be easily understood herein that the time intervals of the rectangular signal (*d*) is almost proportional to the bar widths, since the signal level of the image signal (*a*) is changed gradually as long as the same bar is scanned.

The rectangular signal (*d*) is applied to the serial-to-parallel circuit 40 shown in FIG. 1 so that it is discriminated whether the scanned bar is wide or narrow by comparing each time interval with the reference value intermediate between the wide bar and the narrow bar. The construction and the operation of the S-P circuit 40 has been described in greater detail in the prior patent application cited in "CROSS-REFERENCE TO A RELATED APPLICATION," therefore further description thereof is not made herein. It is of great importance that the time interval of the rectangular signal (*d*) is measured by counting the clock pulse (*f*) produced from the oscillator 501. Since the frequency of the clock pulse (*f*) is twice as high as that of clock pulse (*e*) as shown in (F) of FIG. 4, the time intervals $t_1-t_2$ and $t_2-t_3$ are measured in greater accuracy.

Figure 5:
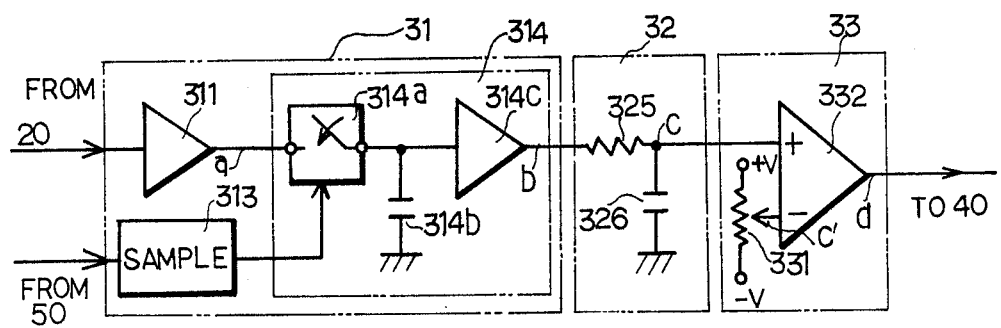
FIG. 5 is another electric wiring diagram illustrating partly the second embodiment of the system shown in FIG. 1.
Figure 6:
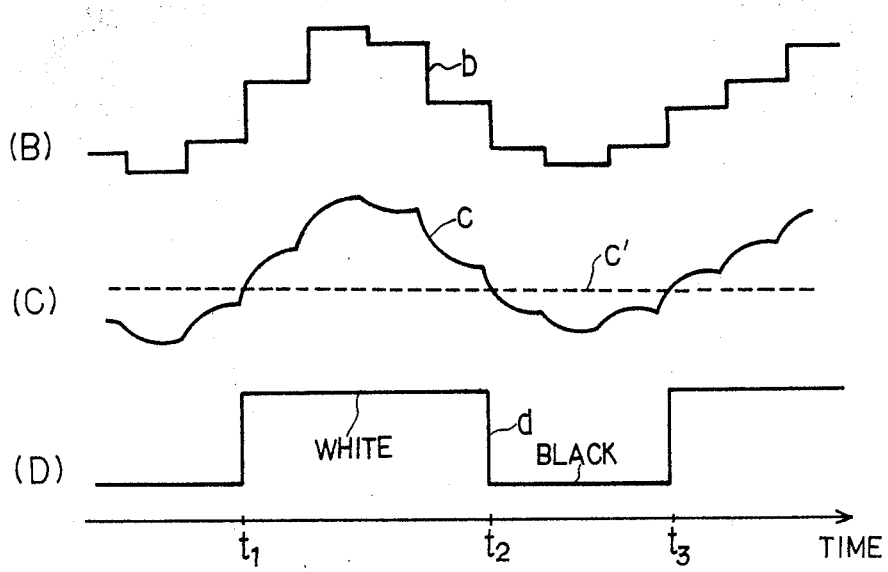
FIG. 6 is another time chart illustrating signal waveforms (B) to (D) useful for explaining the operation of the second embodiment shown in FIG. 4.

The second embodiment is briefly described next with reference to FIGS. 5 and 6, in which only the analog-to-digital circuit 30 and the signal waveforms (B) to (D) are shown, respectively.

The second embodiment differs from the first embodiment in that the second sample pulse generator 313 and the second sample-and-hold circuit 315 of the first embodiment are eliminated, and that the smooth circuit 32 is constituted by a resistor 325 and a capacitor 326. In this second embodiment, the same reference numerals as in the first embodiment represent the identical component parts shown in FIG. 3. According to this arrangement, the image signal (*a*) produced from the image sensor 20 is sampled and held by the sample-and-hold circuit 31 and the staircase output signal (*b*) is produced as shown in (B) of FIG. 6. The smooth circuit 32, constituted as an integrator circuit, produces the continuous signal (*c*) as shown in (C) of FIG. 6. The continuous signal (*c*) changes the signal level gradually in accortance with the time constant determined by the resistor 325 and the capacitor 326. The comparison circuit 33, comparing the continuous signal (*c*) with the reference signal (*c'*), produces the rectangular signal (*d*) as shown in (D) of FIG. 6. The time intervals $t_1-t_2$ and $t_2-t_3$ are measured by counting the clock pulse (*f*) in the same manner as in the first embodiment.

In both first and second embodiments, measuring the time interval of the rectangular signal by counting the clock pulse (*f*) of a fixed frequency which is twice as high as that of the clock pulses (*e*) for scanning and sample-and-holding purposes is very advantageous for width discriminating operation, since the level changes of the rectangular signal are not always synchronized with the clock pulse (*e*) for scanning and sample-and-holding purposes. Provided that the frequency of clock pulse (*f*) for interval measuring purpose is higher than that of clock pulse (*e*) for scanning and sample-and-holding purposes, the interval measurement is attained accurately. The frequency of clock pulse (*f*) for interval measuring purpose, therefore, may not be necessarily determined to be twice as high as that of clock pulse (*e*) for scanning and sample-and-holding purposes. It must be further understood in both embodiments that the numbers of photo responsive elements for scanning the bar widths N and W may be decreased as the frequency of clock pulse (*f*) is made higher than that of clock pulse (*e*).

What we claim is:

1. A system for recognizing bar code information having a plurality of parallel bars recorded in different colors and widths on an object comprising:

a light source for supplying said object with illumination light;

an image sensor having a plurality of light responsive elements aligned to be transverse to the longitudinal direction of said parallel bars, said elements being adapted to be driven one by one by a first clock pulse of a first fixed frequency and to serially produce an image signal having the peak level varying with the density of reflected light produced by said parallel bars on said object;

a sample-and-hold circuit, connected to said image sensor, for sampling the peak level of said image signal in synchronization with said first clock pulse and for holding the sampled peak level of said image signal during one cycle period of said first clock pulse, thereby producing a staircase output signal which changes the signal level from one to the other in synchronization with said first clock pulse;

a smooth circuit, connected to said sample-and-hold circuit, for charging and discharging a capacitor in response to said staircase output signal, thereby producing a continuous output signal which gradually changes the signal level from said one to said the other during said one cycle period of said first clock pulse;

a comparison circuit, connected to said smooth circuit, for comparing said continuous output signal with a reference signal, thereby producing a rectangular signal which changes the signal level each time the former signal reaches the latter signal; and measuring means for counting a second clock pulse of a second fixed frequency higher than said first fixed frequency during each time interval of said rectangular signal, thus measuring each bar width of said a plurality of bars.

2. A system according to claim 1, wherein said sample-and-hold circuit includes delay means for producing a delayed staircase output signal by delaying said staircase output signal by said one cycle period of said first clock pulse, and wherein said smooth circuit includes capacitor control means for controlling the charge and discharge of said capacitor at a rate proportional to the difference between said two staircase output signals.

3. A system according to claim 1, wherein said smooth circuit includes a resistor connected to said capacitor for charging and discharging the latter at a time constant predetermined by said resistor and said capacitor.

4. A system according to claim 1, wherein said second fixed frequency of said second clock pulse is determined to be integer times as high as said first fixed frequency of said first clock pulse.

* * * * *